United States Patent
Liao et al.

(10) Patent No.: US 12,466,933 B2
(45) Date of Patent: Nov. 11, 2025

(54) METHOD FOR PROCESSING WASTE FABRIC CONTAINING POLYESTER AND COTTON FIBERS

(71) Applicant: NAN YA PLASTICS CORPORATION, Taipei (TW)

(72) Inventors: Te-Chao Liao, Taipei (TW); Jung-Jen Chuang, Taipei (TW); Chung-Chi Su, Taipei (TW); Zhang-Jian Huang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 710 days.

(21) Appl. No.: 17/874,263

(22) Filed: Jul. 26, 2022

(65) Prior Publication Data

US 2023/0126608 A1    Apr. 27, 2023

(30) Foreign Application Priority Data

Oct. 25, 2021   (TW) ................................ 110139423

(51) Int. Cl.
| | | |
|---|---|---|
| *C08J 11/08* | (2006.01) | |
| *C08J 11/26* | (2006.01) | |
| *D01G 11/00* | (2006.01) | |

(52) U.S. Cl.
CPC .............. *C08J 11/26* (2013.01); *D01G 11/00* (2013.01); *C08J 2367/00* (2013.01); *D10B 2201/02* (2013.01); *D10B 2331/04* (2013.01)

(58) Field of Classification Search
USPC ............................ 521/48; 528/190, 193, 194
See application file for complete search history.

(56) References Cited

U.S. PATENT DOCUMENTS

| | | | |
|---|---|---|---|
| 4,345,039 A | 8/1982 | Cowan et al. | |
| 2020/0262108 A1* | 8/2020 | Keh | .......................... C08J 11/04 |

FOREIGN PATENT DOCUMENTS

| | | |
|---|---|---|
| CN | 102911395 A | 2/2013 |
| CN | 107629245 A | 1/2018 |
| CN | 214991256 U | 12/2021 |
| WO | WO2014081291 A1 | 5/2014 |

\* cited by examiner

*Primary Examiner* — Terressa Boykin
(74) *Attorney, Agent, or Firm* — Li & Cai Intellectual Property Office

(57) ABSTRACT

A method for processing a waste fabric containing polyester and cotton fibers includes the following steps. The first step is providing a plurality of fabric scraps each containing polyester fibers and cotton fibers. The next step is allowing an acid catalyst aqueous solution to repeatedly contact and react with the fabric scraps at 130° C. to 160° C. in a circulation and backflow manner, so as to separate the cotton fibers from each of the fabric scraps. The last step is recycling the reacted acid catalyst aqueous solution and fabric scraps.

10 Claims, 3 Drawing Sheets

METHOD FOR PROCESSING WASTE FABRIC CONTAINING POLYESTER AND COTTON FIBERS

CROSS-REFERENCE TO RELATED PATENT APPLICATION

This application claims the benefit of priority to Taiwan Patent Application No. 110139423, filed on Oct. 25, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a waste fabric recycling technology, and more particularly to a method for processing a waste fabric based on an acid-catalyzed hydrothermal reaction, which is suitable for processing a waste polyester/cotton blend fabric.

BACKGROUND OF THE DISCLOSURE

With the continuous improvement of people's living conditions and level of consumption, the life cycle of textile fabric has been greatly shortened, causing disposal problems resulting from huge quantities of textile waste. Polyester/cotton blend textiles make up a large proportion of the textile waste. Such blend textiles are difficult to recycle, and can easily cause adverse environmental impacts after being discarded. From the perspectives of environmental protection and resource conservation, recycling is the best way to reduce textile waste.

Currently, there are three main ways for recycling textile waste, namely physical recycling, energy recycling and chemical recycling. In a physical recycling process, textile waste can be processed to a state where reuse of the textile is possible. For example, waste from clothing is cut into small pieces to be used as rags, or a carpet with minor damage is repaired and refurbished for reuse. In an energy recycling process, chemical fibers with a higher calorific value in textile waste are incinerated to generate thermal energy for generation of electricity. This is suitable for disposal of textile waste that cannot be recycled. In a chemical recycling process, high molecular polymers in textile waste are depolymerized, and depolymerization products such as monomers are used to manufacture new chemical fibers. In the chemical recycling process, preliminary results have been achieved in the recycling and reuse of some high value chemical polymer materials.

U.S. Pat. No. 4,345,039 discloses a hydrochloric acid being used as a catalyst to degrade cotton fibers in a polyester/cotton blend textile into cotton powder, in which there is no change in polyester fibers, so as to achieve the separation of polyester and cotton fibers. International Publication No. WO2014/081291 discloses N-methylmorpholine-N-oxide (NMMO) being used as a solvent to dissolve cotton fibers in a polyester/cotton blend textile at high temperatures and a wet spinning process being subsequently used to produce cellulose fibers. China Patent Publication No. CN102911395 discloses concentrated phosphoric acid being used as a solvent to dissolve cotton fibers in a polyester/cotton blend textile at high temperatures, in which there is no change in polyester fibers, and a filtration process is subsequently used for separation of polyester fibers. In addition, a filtrate is converted into phosphoric acid and regenerated fibers.

However, the technical contents mentioned in the above literature either use substances that are more harmful to the environment or solvents that are more expensive, which can cause a greater burden on the environment and higher costs.

SUMMARY OF THE DISCLOSURE

In response to the above-referenced technical inadequacies, the present disclosure provides a method for processing a waste fabric containing polyester and cotton fibers, which is suitable for low cost and large-scale processing of the waste fabric, and the waste fabric after being processed can be recycled and reused.

In one aspect, the present disclosure provides a method for processing a waste fabric containing polyester and cotton fibers, including: providing a plurality of fabric scraps each containing polyester fibers and cotton fibers; having an acid catalyst aqueous solution repeatedly contact and react with the fabric scraps at 130° C. to 160° C. in a circulation and backflow manner, so as to separate the cotton fibers from each of the fabric scraps, in which a contact frequency of the acid catalyst aqueous solution with the fabric scraps is 3 to 4 times per minute; and recycling the reacted acid catalyst aqueous solution and fabric scraps.

In one embodiment of the present disclosure, the fabric scraps are obtained by fragmentizing a waste fabric or processed products thereof.

In one embodiment of the present disclosure, a solid to liquid ratio of the fabric scraps and the acid catalyst aqueous solution is 1:5-25.

In one embodiment of the present disclosure, the acid catalyst aqueous solution includes 0.1 wt % to 10 wt % of at least one acid catalyst.

In one embodiment of the present disclosure, the content of the at least one acid catalyst in the acid catalyst aqueous solution is 3 wt % to 5 wt %.

In one embodiment of the present disclosure, the at least one acid catalyst is an organic acid, an organic acid anhydride, a Lewis acid, or any combination thereof.

In one embodiment of the present disclosure, the organic acid is oxalic acid, the organic acid anhydride is acetic anhydride, and the Lewis acid is zinc chloride.

In one embodiment of the present disclosure, the step of having the acid catalyst aqueous solution repeatedly contact and react with the fabric scraps is carried out for 1 hour to 5 hours.

In one embodiment of the present disclosure, in the step of having the acid catalyst aqueous solution repeatedly contact and react with the fabric scraps, the cotton fibers of each of the fabric scraps are split and dissolved into the reacted acid catalyst aqueous solution.

In one embodiment of the present disclosure, the method further includes: recycling the cotton fibers from the reacted acid catalyst aqueous solution.

In one embodiment of the present disclosure, the method further includes: performing degradation and repolymerization processes on the polyester fibers of each of the reacted fabric scraps, so as to produce recycled polyester pellets.

In conclusion, the method for processing a waste fabric provided by the present disclosure can include: dividing the waste fabric (e.g., a polyester/cotton blend fabric) into fabric scraps; placing the fabric scraps into a reactor and allowing an acid catalyst aqueous solution to repeatedly contact and react with the fabric scraps under hydrothermal conditions in a circulation and backflow manner; and recycling the reacted acid catalyst aqueous solution and fabric scraps. Therefore, a lower solid to liquid ratio can be used for reaction, thereby shortening a process time, reducing costs, and increasing a recycle rate. As a result, the method can have significant economic benefits, meet the requirements of industrialized production, and help achieve the recycling of textile resources.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
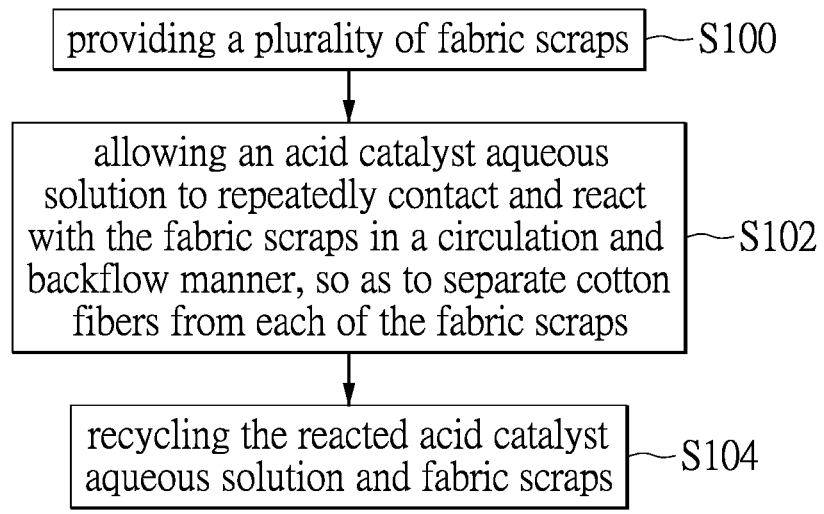
FIG. 1 is a flowchart of a method for processing a waste fabric according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

All materials used in the following examples are available from commercial sources unless otherwise specified. All operations or instruments used in the following examples are common operations or instruments in the art unless otherwise specified. All percentages and contents described in the following examples are expressed by weight unless otherwise indicated.

First Embodiment

Referring to FIG. 1, a first embodiment of the present disclosure provides a method for processing a waste fabric, in which the waste fabric is a raw material and an acid-catalyzed hydrothermal reaction is used to separate cotton fibers from the waste fabric, such that degradation products of the cotton fibers and the waste fabric containing polyester fibers can be obtained. Therefore, the separation, recycling and reuse of polyester and cotton fibers can be achieved. As shown in FIG. 1, the method for processing the waste fabric of the present disclosure includes the following specific steps: step S100, providing a plurality of fabric scraps; step S102, allowing an acid catalyst aqueous solution to repeatedly contact and react with the fabric scraps in a circulation and backflow manner, so as to separate cotton fibers from each of the fabric scraps; and step S104, recycling the reacted acid catalyst aqueous solution and fabric scraps.

In step S100, the fabric scraps are obtained by breaking apart a waste fabric or its processed products (e.g., clothing) Each of the fabric scraps contains polyester fibers and cotton fibers. The waste fabric can be a polyester/cotton blend fabric, in which a content of polyester can be 1 to 99 wt %. In practice, the waste fabric can be broken apart into the fabric scraps by cutting, a fragment size of which can be determined according to subsequent processing conditions. For example, each of the fabric scraps can have a fragment size of 3 cm (length)×3 cm (width). The above description is for exemplary purposes only and is not intended to limit the scope of the present disclosure.

In step S102, the fabric scraps are placed in a closed environment, and the acid catalyst aqueous solution is continually circulated back into the closed environment to repeatedly contact and react with the fabric scraps. The entire reaction process can proceed for 1 hour to 5 hours without stirring, in which the cotton fibers of each of the fabric scraps are degraded into cotton fiber fragments and dissolved into the reacted acid catalyst aqueous solution, but there is no change in the polyester fibers of each of the fabric scraps. Preferably, a temperature of the closed environment is from 130° C. to 160° C., and a contact frequency of the acid catalyst aqueous solution with the fabric scraps is 3 to 4 times per minute. Therefore, the fabric scraps can be reacted with the acid catalyst aqueous solution in a solid to liquid ratio of 1:5-25, which is significantly lower than a solid to liquid ratio (1:30-200) used in the conventional technology. Accordingly, a reaction time can be shortened, and an amount of the acid catalyst aqueous solution can be greatly reduced so as to reduce costs. Furthermore, since no solvent is added during the entire reaction process, the method is not harmful to the environment.

In practice, the acid catalyst aqueous solution includes at least one acid catalyst and water, and a content of the at least one acid catalyst in an aqueous system is from 0.1 wt % to 10 wt %, and preferably from 3 wt % to 5 wt %. It is worth mentioning that, although a higher content of the at least one acid catalyst can cause an increase in degradation speed of the cotton fibers of the fabric scraps to shorten a reaction time, it also causes an increase in cost. The at least one acid catalyst can be an organic acid, an organic acid anhydride, a Lewis acid, or any combination thereof. The above description is for exemplary purposes only and is not intended to limit the scope of the present disclosure.

Specific examples of the organic acid include methanesulfonic acid, oxalic acid, tartaric acid, citric acid, malic acid, formic acid, and acetic acid. The organic acid is preferably oxalic acid. Specific examples of the organic acid anhydride include acetic anhydride, propionic anhydride, butyric anhydride, valeric anhydride, lauric anhydride, palmitic anhydride, stearic anhydride, malonic anhydride, succinic anhydride, glutaric anhydride, adipic anhydride, acrylic anhydride, cinnamic anhydride, phthalic anhydride, acetic benzoic anhydride, amino acid anhydride, and derivatives thereof. The organic acid anhydride is preferably acetic anhydride. Specific examples of the Lewis acid include boron trichloride, zinc chloride, and zinc tetrafluoroborate. The Lewis acid is preferably zinc chloride. However, such examples are not intended to limit to the present disclosure.

Figure 2:
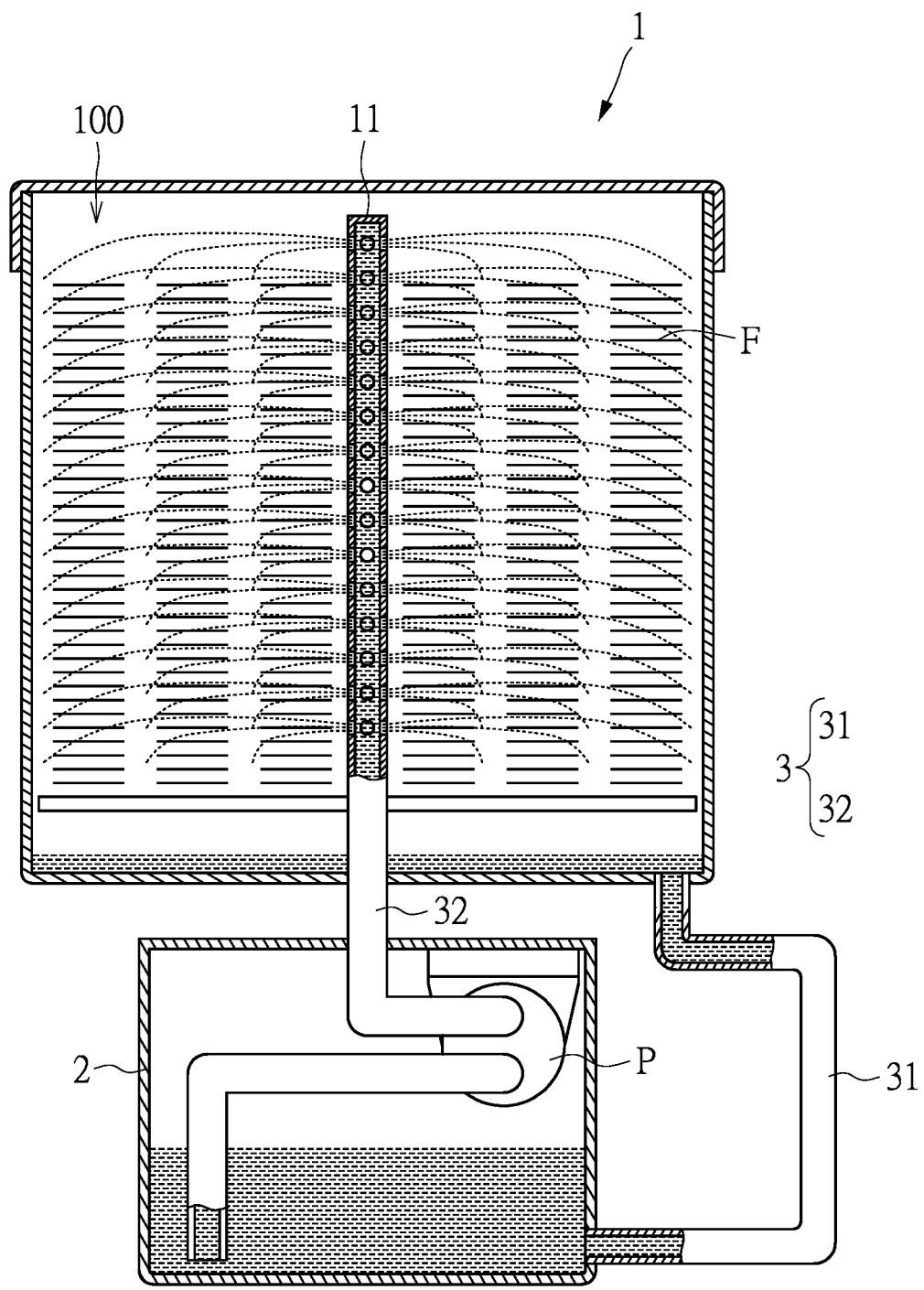
FIG. 2 is a schematic view of an apparatus used for the method for processing the waste fabric according to the first embodiment of the present disclosure.

Reference is made to FIG. 2, which is a schematic view of an apparatus used for the method for processing the waste fabric of the present disclosure. As shown in FIG. 2, the apparatus includes a reactor 1 and a liquid storage tank 2. The reactor 1 can have a closed environment 100 formed therein and at least one porous tube 11 disposed in the closed environment 100. The porous tube 11 is in communication with the liquid storage tank 2 via a circulation pipeline 3 connected with a circulation pump P. In use, the fabric scraps can be placed in the closed environment 100 by a suitable carrier such as a bracket or a hanging frame (not shown in FIG. 2), the acid catalyst aqueous solution can be circulated between the reactor 1 and the liquid storage tank 2 through the circulation pipeline 3 to repeatedly contact and react with the fabric scraps, so as to dissolve out the cotton fibers of the fabric scraps. More specifically, the acid catalyst aqueous solution can be sprayed out from the porous tube 11 to come into uniform contact with the fabric scraps. Furthermore, an excess of the acid catalyst aqueous solution can be directed into an upstream section 31 of the circulation pipeline 3 from the bottom of the reactor 1, and then be directed into the liquid storage tank 2. Afterward, the acid catalyst aqueous solution can be transferred to the porous tube 11 to be sprayed again through a downstream section 32 of the circulation pipeline 3. The entire process can be fully automated.

It is worth mentioning that a new acid catalyst aqueous solution can be supplied at any time during the reaction process, so as to maintain the concentration of the acid catalyst in the aqueous system within a desired concentration range. The concentration of the acid catalyst in the aqueous system varies depending on a pH value of the aqueous system. In practice, the pH value of the aqueous system can be measured manually or automatically measured by a pH meter. When the pH value of the aqueous system is greater than 4, a new acid catalyst aqueous solution can be directed into the liquid storage tank 2 to mix well with the reacted acid catalyst aqueous solution.

In step S104, the reacted acid catalyst aqueous solution (i.e., the acid catalyst aqueous solution containing cotton fiber fragments) and the reacted fabric scraps can be recycled individually. Therefore, the separation, recycling and reuse of polyester and cotton fibers can be achieved.

Second Embodiment

Figure 3:
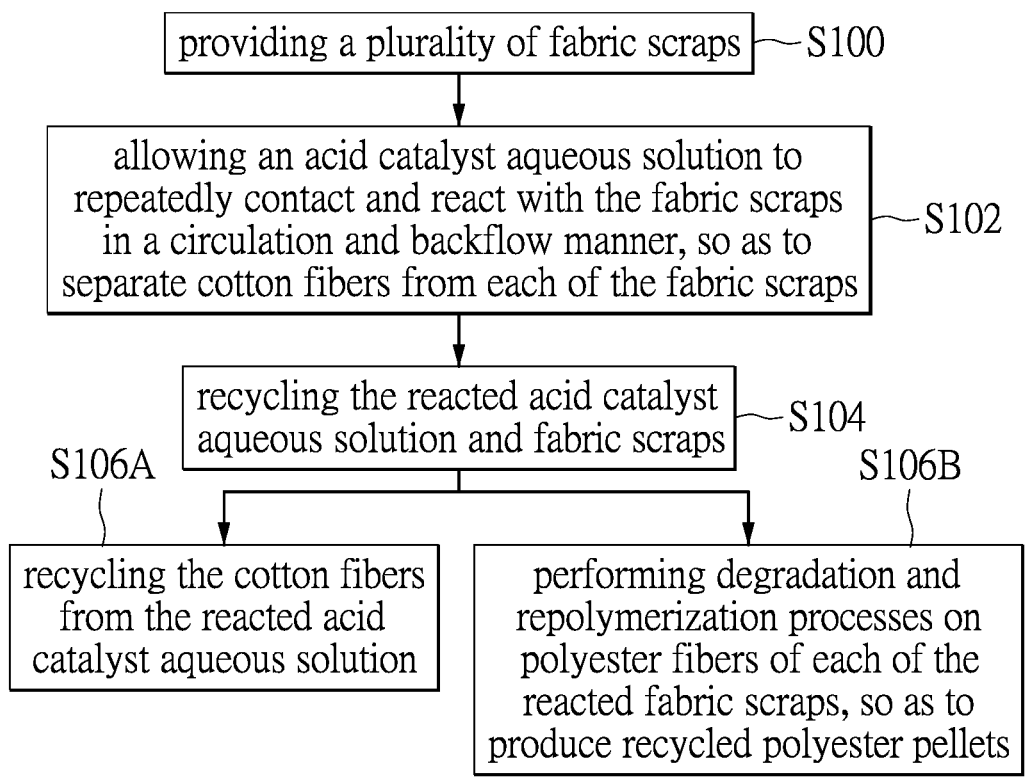
FIG. 3 is a flowchart of a method for processing a waste fabric according to a second embodiment of the present disclosure.

Referring to FIG. 3, a second embodiment of the present disclosure provides a method for processing a waste fabric, which mainly includes: step S100, providing a plurality of fabric scraps; step S102, allowing an acid catalyst aqueous solution to repeatedly contact and react with the fabric scraps in a circulation and backflow manner, so as to separate cotton fibers from each of the fabric scraps; and step S104, recycling the reacted acid catalyst aqueous solution and fabric scraps. The implementation details of step S100 to step S104 are described in the first embodiment and will not be reiterated herein. The main difference between the second embodiment and the first embodiment is that the method further includes: step S106A, recycling the cotton fibers from the reacted acid catalyst aqueous solution; and step S106B, performing degradation and repolymerization processes on the polyester fibers of each of the reacted fabric scraps, so as to produce recycled polyester pellets.

In step S106A, the cotton fibers can be recycled from the reacted acid catalyst aqueous solution by filtering. For example, a filtration membrane having a pore size of 100 μm is used to filter the reacted acid catalyst aqueous solution, so that the cotton fiber fragments can be retained on the filtration membrane for collection. A relevant analysis has found that a recycle rate of the cotton fiber fragments can reach more than 80%, which is mixed with no polyester fibers and can be added to a fiber raw material for reuse.

In step S106B, the polyester fibers of the reacted fabric scraps can be depolymerized into monomers and/or oligomers and subsequently repolymerized by using a physical or chemical regeneration process. It has been revealed from a relevant analysis that a recycle rate of the polyester fibers can reach more than 95%, which is mixed with no cotton fibers and can be produced into recycled polyester pellets (r-PET) for reuse.

More specifically, in the physical regeneration process, the reacted fabric scraps are melted and extruded to form pellets by an extruder. In addition, in the chemical regeneration process, a chemical depolymerizing solution is used to depolymerize the polyester fibers and the resulting monomers and/or oligomers are repolymerized under specific conditions to form pellets. The chemical depolymerizing solution can be water, methanol, ethanol, ethylene glycol, diethylene glycol, or any combination thereof, but the present disclosure is not limited thereto.

The present disclosure will be further described below in conjunction with specific examples below.

Specific Example 1

A discarded shirt having a polyester/cotton blend ratio of 70/30 is divided into a plurality of fabric scraps each having a fragment size of 3 cm (length)×3 cm (width). The fabric scraps are placed in a closed reactor with at least one porous tube, and a heater is turned on to allow an internal temperature of the reactor to reach 130° C. Afterward, an acid catalyst aqueous solution including 3% of oxalic acid is continually circulated back into the reactor to repeatedly contact and react with the fabric scraps at a frequency of 3 times per minute. The entire reaction process is carried out for 2 hours.

The heater is turned off after the completion of the reaction. After the internal temperature of the reactor is cooled down to room temperature, the reacted acid catalyst aqueous solution and fabric scraps are each taken out from the reactor. A filtration membrane made of polytetrafluoroethylene and having a pore size of 0.45 μm is used to filter out and recycle cotton fiber fragments from the reacted acid catalyst aqueous solution. The reacted fabric scraps are directly recycled. Afterward, the recycled fabric scraps and cotton fiber fragments are dried to constant weight in an oven at 110° C. after being washed. It is found from an analysis that the recycle rate of the fabric scraps is 95% and the recycle rate of the cotton fiber fragments is 83%.

Specific Example 2

A pair of discarded pants having a polyester/cotton blend ratio of 70/30 is divided into a plurality of fabric scraps each having a fragment size of 3 cm (length)×3 cm (width). The fabric scraps are placed in a closed reactor with at least one porous tube, and a heater is turned on to allow an internal temperature of the reactor to reach 140° C. Afterward, an acid catalyst aqueous solution including 4% of acetic anhydride is continually circulated back into the reactor to repeatedly contact and react with the fabric scraps at a frequency of 3 times per minute. The entire reaction process is carried out for 2 hours.

The heater is turned off after the completion of the reaction. After the internal temperature of the reactor is cooled down to room temperature, the reacted acid catalyst aqueous solution and fabric scraps are each taken out from the reactor. A filtration membrane made of polytetrafluoroethylene and having a pore size of 0.45 μm is used to filter out and recycle cotton fiber fragments from the reacted acid catalyst aqueous solution. The reacted fabric scraps are directly recycled. Afterward, the recycled fabric scraps and cotton fiber fragments are dried to constant weight in an oven at 110° C. after being washed, respectively. It is found from an analysis that the recycle rate of the fabric scraps is 97% and the recycle rate of the cotton fiber fragments is 85%.

Specific Example 3

A pair of pants having a polyester/cotton blend ratio of 50/50 is divided into a plurality of fabric scraps each having a fragment size of 3 cm (length)×3 cm (width). The fabric scraps are placed in a closed reactor with at least one porous tube, and a heater is turned on to allow an internal temperature of the reactor to reach 150° C. Afterward, an acid catalyst aqueous solution including 4% of zinc chloride is continually circulated back into the reactor to repeatedly contact and react with the fabric scraps at a frequency of 3 times per minute. The entire reaction process is carried out for 2 hours.

The heater is turned off after the completion of the reaction. After the internal temperature of the reactor is cooled down to room temperature, the reacted acid catalyst aqueous solution and fabric scraps are each taken out from the reactor. A filtration membrane made of polytetrafluoroethylene and having a pore size of 0.45 μm is used to filter out and recycle cotton fiber fragments from the reacted acid catalyst aqueous solution. The reacted fabric scraps are directly recycled. Afterward, the recycled fabric scraps and cotton fiber fragments are dried to constant weight in an oven at 110° C. after being washed, respectively. It is found from an analysis that the recycle rate of the fabric scraps is 95% and the recycle rate of the cotton fiber fragments is 81%.

Beneficial Effects of the Embodiments

In conclusion, in the method for processing a waste fabric provided by the present disclosure, by virtue of "allowing an acid catalyst aqueous solution to repeatedly contact and react with the fabric scraps in a circulation and backflow manner, in which a contact frequency of the acid catalyst aqueous solution with the fabric scraps is 3 to 4 times per minute," a lower solid-to-liquid ratio can be used for reaction, so that the cotton fibers of the fabric scraps can be degraded and dissolved out in a short period of time. This helps to achieve the separation, recycling and reuse of polyester and cotton fibers.

Furthermore, since the fabric scraps are reacted with the acid catalyst aqueous solution in a lower solid-to-liquid ratio, an amount of the acid catalyst aqueous solution can be greatly reduced so as to reduce costs. In addition, since no solvent is added during the entire reaction process, the method is not harmful to the environment.

More specifically, the method for processing a waste fabric of the present disclosure can help to achieve the recycling of textile resources, have significant economic benefits, and meet the requirements of industrialized production.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing a waste fabric containing polyester and cotton fibers, comprising:
   providing a plurality of fabric scraps each containing polyester fibers and cotton fibers;
   having an acid catalyst aqueous solution repeatedly contact and react with the fabric scraps at 130° C. to 160° C. in a circulation and backflow manner, so as to separate the cotton fibers from each of the fabric scraps, wherein a contact frequency of the acid catalyst aqueous solution with the fabric scraps is 3 to 4 times per minute, and a solid to liquid ratio of the fabric scraps to the acid catalyst aqueous solution is 1:5-25; and
   recycling the reacted acid catalyst aqueous solution and fabric scraps.

2. The method according to claim 1, wherein the fabric scraps are obtained by fragmentizing a waste fabric or processed products thereof.

3. The method according to claim 1, wherein the acid catalyst aqueous solution includes 0.1 wt % to 10 wt % of at least one acid catalyst.

4. The method according to claim 3, wherein the content of the at least one acid catalyst in the acid catalyst aqueous solution is 3 wt % to 5 wt %.

5. The method according to claim 3, wherein the at least one acid catalyst is an organic acid, an organic acid anhydride, a Lewis acid, or any combination thereof.

6. The method according to claim 5, wherein the organic acid is oxalic acid, the organic acid anhydride is acetic anhydride, and the Lewis acid is zinc chloride.

7. The method according to claim 1, wherein the step of having the acid catalyst aqueous solution repeatedly contact and react with the fabric scraps is carried out for 1 hour to 5 hours.

8. The method according to claim 7, wherein in the step of having the acid catalyst aqueous solution repeatedly contact and react with the fabric scraps, the cotton fibers of each of the fabric scraps are split and dissolved into the reacted acid catalyst aqueous solution.

9. The method according to claim 1, further comprising: recycling the cotton fibers from the reacted acid catalyst aqueous solution.

10. The method according to claim 1, further comprising: performing degradation and repolymerization processes on the polyester fibers of each of the reacted fabric scraps, so as to produce recycled polyester pellets.

* * * * *